(12) United States Patent
Zhu

(10) Patent No.: US 9,025,550 B2
(45) Date of Patent: May 5, 2015

(54) COORDINATED MULTIPOINT RESOURCE MANAGEMENT

(71) Applicant: Fujitsu Limited, Kawasaki-shi, Kanagawa (JP)

(72) Inventor: Chenxi Zhu, Fairfax, VA (US)

(73) Assignee: Fujitsu Limited, Kawasaki-shi (JP)

( * ) Notice: Subject to any disclaimer, the term of this patent is extended or adjusted under 35 U.S.C. 154(b) by 79 days.

(21) Appl. No.: 13/747,251

(22) Filed: Jan. 22, 2013

(65) Prior Publication Data

US 2013/0308474 A1    Nov. 21, 2013

Related U.S. Application Data

(60) Provisional application No. 61/649,810, filed on May 21, 2012.

(51) Int. Cl.
*H04W 72/08* (2009.01)
*H04L 5/00* (2006.01)

(52) U.S. Cl.
CPC .......... *H04W 72/085* (2013.01); *H04L 5/0048* (2013.01); *H04L 5/0091* (2013.01); *H04L 5/0035* (2013.01)

(58) Field of Classification Search
None
See application file for complete search history.

(56) References Cited

U.S. PATENT DOCUMENTS

| | | | |
|---|---|---|---|
| 2013/0003788 A1* | 1/2013 | Marinier et al. | 375/219 |
| 2013/0039203 A1* | 2/2013 | Fong et al. | 370/252 |
| 2013/0077513 A1* | 3/2013 | Ng et al. | 370/252 |
| 2013/0208604 A1* | 8/2013 | Lee et al. | 370/252 |
| 2013/0260741 A1* | 10/2013 | Yamada | 455/422.1 |
| 2013/0286866 A1* | 10/2013 | Hammarwall et al. | 370/252 |

FOREIGN PATENT DOCUMENTS

WO    WO 2011100672    8/2011    ............. H04W 4/00

OTHER PUBLICATIONS

International Search Report and Written Opinion; PCT/US2013/040301; pp. 12, Oct. 9, 2013.
Nortel; "Updates on Cell CLustering for CoMP Transmission/Reception"; 3GPP TSG-RAN Working Group 1, Meeting # 57; pp. 3, 2009.
Qualcomm Europe; "Coordinated Multi-Point downlink transmission in LTE-Advanced"; 3GPP TSG-RAN WG1, # 55; pp. 6, 2008.
ZTE Corporation; "DL Reference Signal Design for CSI Generation in LTE-Advanced"; 3GPP TSG-RAN WG1, Meeting # 58; pp. 5, 2009.

* cited by examiner

*Primary Examiner* — Anh-Vu Ly
*Assistant Examiner* — Hashim Bhatti
(74) *Attorney, Agent, or Firm* — Baker Botts L.L.P.

(57) ABSTRACT

A method for resource management includes determining a Coordinated Multi-point Processing (CoMP) resource management set of a user equipment (UE), receiving a set of channel state information reference signals (CSI-RS) at the UE from a transmission point (TP) included within the CoMP resource management set, determining a resource management parameter based upon the CSI-RS signals, and sending the determined resource management parameter to the TP. The CoMP resource management set includes a plurality of candidate TPs for which downlink communication may be established with the UE.

20 Claims, 4 Drawing Sheets

| | CoMP Measurement Sets | CoMP Resource Management Sets |
|---|---|---|
| UE1 | { $CSI\text{-}RS_{RRH1}^{\{1,2\}}$ }, { $CSI\text{-}RS_{MeNB}^{\{1,2,3,4\}}$ } | { $CSI\text{-}RS_{RRH1}^{\{1,2\}}$ }, { $CSI\text{-}RS_{MeNB}^{\{1,2\}}$ }, { $CSI\text{-}RS_{RRH2}^{\{1,2\}}$ } |
| UE2 | { $CSI\text{-}RS_{RRH1}^{\{1,2\}}$ } | { $CSI\text{-}RS_{RRH1}^{\{1,2\}}$ }, { $CSI\text{-}RS_{MeNB}^{\{1,2\}}$ } |
| UE3 | { $CSI\text{-}RS_{RRH2}^{\{1,2\}}$ }, { $CSI\text{-}RS_{MeNB}^{\{1,2,3,4\}}$ } | { $CSI\text{-}RS_{RRH2}^{\{1,2\}}$ }, { $CSI\text{-}RS_{MeNB}^{\{1,2\}}$ }, { $CSI\text{-}RS_{RRH1}^{\{1,2\}}$ } |
| UE4 | { $CSI\text{-}RS_{RRH2}^{\{1,2\}}$ } | { $CSI\text{-}RS_{RRH2}^{\{1,2\}}$ }, { $CSI\text{-}RS_{MeNB}^{\{1,2\}}$ } |

COORDINATED MULTIPOINT RESOURCE MANAGEMENT

RELATED APPLICATION

This application claims benefit under 35 U.S.C. §119(e) of U.S. Provisional Application Ser. No. 61/649,810, entitled "COORDINATED MULTIPOINT RESOURCE MANAGEMENT," filed May 21, 2012, the entire content of which is incorporated herein by reference.

TECHNICAL FIELD

The present invention relates generally to communication networks and, more particularly, to wireless communication networks.

BACKGROUND

Long-Term Evolution-Advanced (LTE-A) may become the dominant standard for fourth-generation (4G) wireless technology. The current version of the LTE-A standard is Release 11 (Rel. 11), and a particular feature of Rel. 11 is Coordinated Multi-point Processing (CoMP). Down link (DL) CoMP is a special type of multiple-input/multiple-output (MIMO) transmission in which the multiple transmission antennas of one or more transmission points transmit to receive antennas located on the User Equipment (UE).

In DL CoMP, multiple transmission points (TP) can potentially transmit to a UE. A UE monitors the channel state information (CSI) from the TPs in its CoMP measurement set and feeds back the CSI to the evolved Node B (eNB), which makes decision on which TP (or TPs) to use in the next DL transmission to the UE, and which transmission scheme to use. A CoMP resource management set is used for the UE to determine (or make a suggestion to the eNB regarding) which TPs to include in its CoMP measurement set.

SUMMARY

In one embodiment, a method for resource management includes determining a Coordinated Multi-point Processing (CoMP) resource management set of a user equipment (UE), receiving a set of channel state information (CSI) signals at the UE from a transmission point (TP) included within the CoMP resource management set, determining a resource management parameter based upon the CSI signals, and sending the determined resource management parameter to the TP. The CoMP resource management set includes a plurality of candidate TPs for which downlink communication may be established with the UE.

In another embodiment, an article of manufacture includes a computer readable medium, and computer-executable instructions carried on the computer readable medium. The instructions are readable by a processor. The instructions, when read and executed, cause the processor to determine a CoMP resource management set of a UE, receive a set of CSI signals at the UE from a TP included within the CoMP resource management set, determine a resource management parameter based upon the CSI signal, and send the determined resource management parameter to the TP. The CoMP resource management set includes a plurality of candidate TPs for which downlink communication may be established with the UE.

In yet another embodiment, an apparatus includes a processor, a computer readable medium communicatively coupled to the processor, and computer-executable instructions carried on the computer readable medium. The instructions, when read and executed, cause the processor to determine a CoMP resource management set of a UE, receive a set of CSI signals at the UE from a TP included within the CoMP resource management set, determine a resource management parameter based upon the CSI signal, and send the determined resource management parameter to the TP. The CoMP resource management set includes a plurality of candidate TPs for which downlink communication may be established with the UE.

In still yet another embodiment, a method for resource management includes sending one or more sets of CSI signals from a host TP to one or more UE, receiving at the host TP one or more determined resource management parameters based upon the CSI signals from each UE, and, based upon the determined resource management parameters, determining whether to include a second TP in a CoMP resource management set. The TP is included within the CoMP resource management set of each UE.

In another, further embodiment, an article of manufacture includes a computer readable medium, and computer-executable instructions carried on the computer readable medium. The instructions are readable by a processor. The instructions, when read and executed, cause the processor to send one or more sets of CSI signals from a host TP to one or more UE, receive at the host TP one or more determined resource management parameters based upon the CSI signals from each UE, and, based upon the determined resource management parameters, and determine whether to include a second TP in a CoMP resource management set. The TP is included within the CoMP resource management set of each UE.

In yet another, further embodiment, an apparatus includes a processor, a computer readable medium communicatively coupled to the processor, and computer-executable instructions carried on the computer readable medium. The instructions, when read and executed, cause the processor to send one or more sets of CSI signals from a host TP to one or more UE, receive at the host TP one or more determined resource management parameters based upon the CSI signals from each UE, and, based upon the determined resource management parameters, and determine whether to include a second TP in a CoMP resource management set. The TP is included within the CoMP resource management set of each UE.

The object and advantages of the invention will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
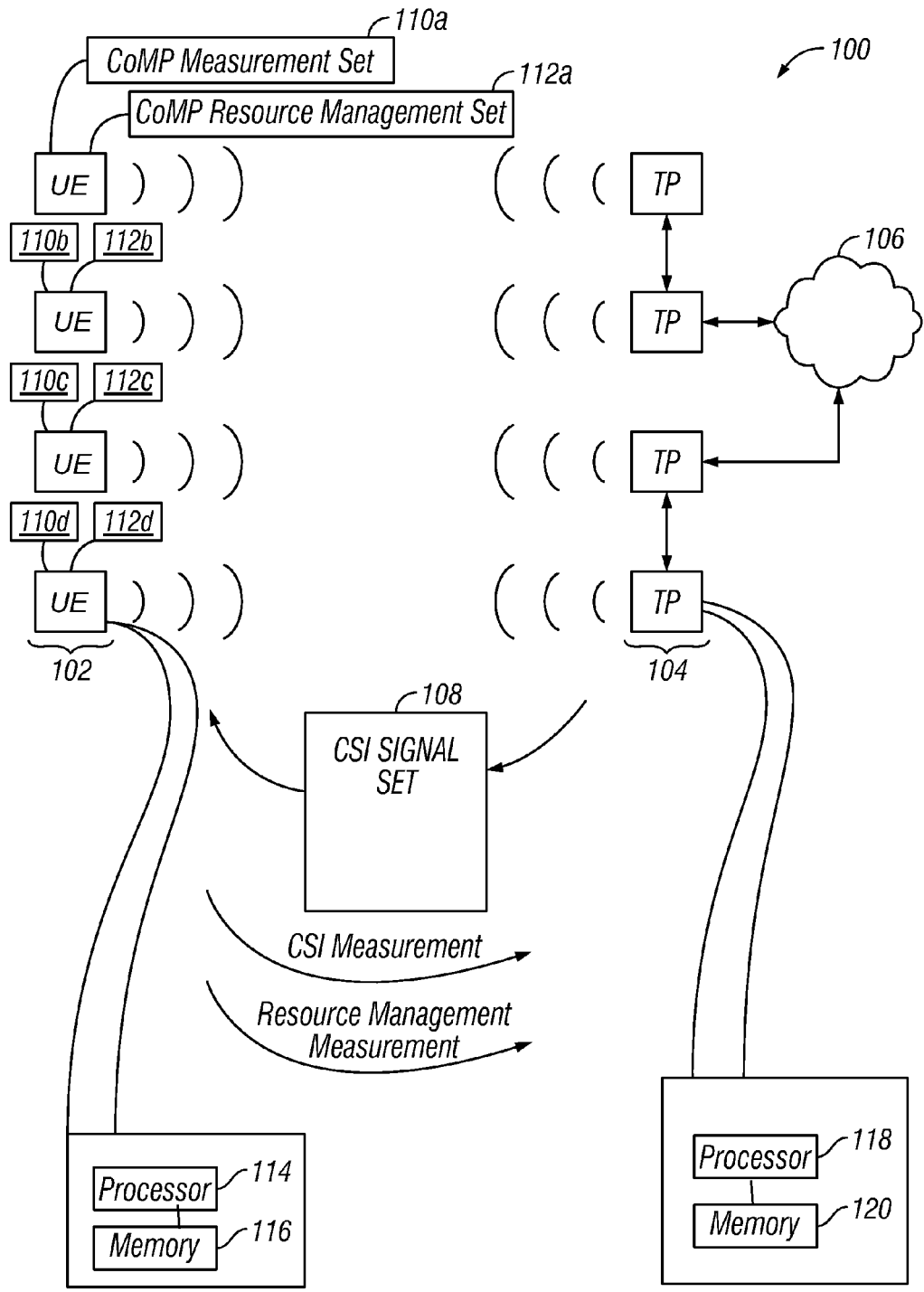
FIG. 1 illustrates an example embodiment of a system configured for coordinated multipoint resource management.

FIG. 1 illustrates an example embodiment of a system 100 configured for coordinated multipoint resource management.

In one embodiment, such coordinated multipoint resource management may use channel state information reference signals (CSI-RS) for CoMP resource management. System 100 may include a wireless communications system with one or more electronic devices in communication with each other. For example, system 100 may include one or more TPs 104 communicatively coupled to one or more UEs 102.

System 100 may include a wireless communications system configured to operate in any suitable manner. In one embodiment, system 100 may be configured to perform wireless communications using LTE-A and 4G wireless technology.

UEs 102 may be implemented in any suitable manner. For example, UEs 102 may include a mobile phone, smartphone, tablet, personal data assistant, computer, server, laptop, peripheral, attachment, or any other suitable electronic device or a combination thereof. Each of UEs 102 may include a processor 114 communicatively coupled to a memory 116. Instructions may be resident within memory 116 for execution by processor 114 that, when loaded and executed, configure UE 102 and cause UE 102 to perform operations as described herein.

TPs 104 may be implemented in any suitable manner according to the descriptions provided herein. For example, TPs 104 may include a remote radio head, radio head, tower, antennae, booster, base station, eNB, or any other suitable electronic device or a combination thereof. Each TP 104 may include, for example, a processor 118 communicatively coupled to a memory 120. Instructions may be resident within memory 120 for execution by processor 118 that, when loaded and executed, configure TP 104 and cause TP 104 to perform operations as described herein.

Processors 114, 118 may comprise, for example, a microprocessor, microcontroller, digital signal processor (DSP), application specific integrated circuit (ASIC), or any other digital or analog circuitry configured to interpret and/or execute program instructions and/or process data. In some embodiments, processors 114, 118 may interpret and/or execute program instructions and/or process data stored in memories 116, 120. Memories 116, 120 may be configured in part or whole as application memory, system memory, or both. Memories 116, 120 may include any system, device, or apparatus configured to hold and/or house one or more memory modules. Each memory module may include any system, device or apparatus configured to retain program instructions and/or data for a period of time (e.g., computer-readable storage media).

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

UEs 102 may be configured to transmit information to and from TPs 104, which may in turn be configured to transmit the resultant signals to and from other TPs 104. TPs 104 may be configured to translate, transform, or otherwise convert signals received from other TPs 104 and transmit them on a suitable network 106, such as a mobile communications network or backhaul network. Furthermore, TPs 104 may be configured to receive signals through network 106 and transmit them to other TPs 104 or to UEs 102.

UEs 102 may be configured to record, maintain, or transmit any suitable kind and number of information for assisting with the management of wireless communication in system 100. For example, CoMP resource management set 112 may include a listing, indication, or other denotation of one or more TPs 104 for which the associated UE 102 may monitor to determine whether to facilitate an active data link with the respective TP 104 for users of UE 102 to access system 100.

In another example, a given UE 102 may include a CoMP measurement set 110. CoMP measurement set 110 may include a listing, indication, or other denotation of one or more TPs 104 for which the associated UE 102 may monitor to provide signal information back to the TP 104. Such a set may include network elements for which an active downlink is present between the respective UE 102 and TP 104.

In a further embodiment, for a given UE 102, the contents of its CoMP resource management set 112 may be a superset of its CoMP measurement set 110.

TPs 104 may be configured to record, maintain, or transmit any suitable kind and number of information for assisting with the management of wireless communication in system 100. For example, a given pair of UEs 102 and TPs 104 may be configured to transmit a CSI-RS signal set 108. Such a transmittal of CSI-RS signal set 108 from a given TP 104 to an associated UE 102 may facilitate the associated UE 102 to be able to measure the CSI of the UE 102. In such a case, the given TP 104 may be included within the CoMP measurement set 110 of the UE 102.

In one embodiment, such a transmittal of CSI-RS signal set 108 from a given TP 104 to an associated UE 102 may facilitate the associated UE 102 to be able to perform resource management associated with the TP 104. In such a case, the given TP 104 may be included within the CoMP resource management set 112 of the UE 102.

Thus, a given TP 104 may be configured to send an associated CSI-RS signal set 108 to one or more of UEs 102. A given UE 102 may monitor the CSI-RS signal set 108 from TPs 104 within its CoMP resource management set 112 and within its CoMP measurement set 110. The contents of CSI-RS signal set 108 may be transmitted with sufficient details. Such details may include, for example, a number of CSI-RS ports, a transmission frequency, or the granularity in the frequency domain. The number of CSI-RS ports may match the largest possible number of antenna ports in, for example, a CoMP Physical Downlink Shared Channel (PDSCH) transmission. In one embodiment, up to eight antenna ports may be included. CSI-RS signal set 108 may be transmitted in the entire bandwidth of communication between TP 104 and UE 102 to support wideband and subband CSI measurement. Such measurements may include, for example, Channel Quality Indicator (CQI), Precoding Matrix Indicator (PMI), and Rank Indicator (RI).

The received CSI-RS signal set 108 may be received by a given UE 102, which may be configured to utilize the CSI-RS signal set 108 in any suitable manner. In one embodiment, a given UE 102 may be configured to use a received CSI-RS signal set 108 for CoMP measurement for each TP denoted within its CoMP measurement set 110. In another embodiment, a given UE 102 may be configured to use a received CSI-RS signal set 108 for CoMP resource management for each TP denoted within its CoMP resource management set 112.

To conduct CoMP measurements, a given UE 102 may be configured to utilize detailed CSI information to estimate wideband and subband CQI, PMI, and RI and feed the resultant estimates back to the associated TP 104. Such an estimate may be transported to other TPs 104. The signal processing at a UE 102 may require that its number of CSI-RS ports evaluated should typically match that of the largest number of transmission ports used in any associated PDSCH transmissions. In one embodiment, such a number may include the largest possible number of DM-RS ports, such as eight. Consequently, a given TP 104 may be configured to transmit up to eight CSI-RS sets of signals in association with supporting eight-by-eight MIMO. System 100 may experience fast-fading conditions, and as a result, CSI-RS signal sets 108 for CoMP measurement may be sent frequently. Furthermore, a UE 102 that has received a CSI-RS signal set 108 for CoMP measurement should promptly reply with measured CSI-RS to allow TP 104 which sent the CSI-RS signal set 108, or another TP 104 coupled to such a TP 104, to make any necessary transmission scheduling decisions. In addition, the time scale of such CSI-RS signal transmission and feedback may be proportional to the coherent time of the channel used or be in reverse proportion to the Doppler shift. Furthermore, the density of the CSI-RS signal transmission in the frequency domain may set so as to be high enough to address frequency selective fading.

However, the minimum requirements for configuring a given UE 102 for CoMP resource management purposes may be different than that of configuring the given UE 102 for CoMP measurement. UE 102 may monitor more than one TP 104 for resource management because the UE's CoMP resource management set 112 may include additional candidate TPs 104 that may be further down-selected but are not currently in active user data transmission with the given UE 102. In other words, CoMP resource management set 112 may be a superset of CoMP measurement set 110 for a given UE 102. For CoMP resource management purposes, a given UE 102 may monitor radio resource management (RRM) parameters of its CSI-RS ports such as reference signal received power (RSRP). UE 102 may be configured to conduct these RRM measurements on relatively longer and coarser time and frequency scales, when compared to CoMP measurements, and may only need to account for large scale fading such as path-loss and shadowing. Estimation of detailed CSI such as PMI, CQI, or RI may be unnecessary for CoMP resource management.

From the perspective of TPs 104, CoMP measurement set 110 may carry a fixed overhead because CoMP measurement set 110 occupies radio resource elements. However, from the perspective of a given UE 102, received CSI-RS signal set 108 for use with CoMP measurement set 110 may take processing power and energy in order compute CSI or RSRP. System 100 may be configured to reduce the resources of TPs 104 and UEs necessary to perform CoMP resource management. In various embodiments, the radio resources used from a TP 104 perspective and the power consumption and processing overhead from a UE 102 perspective may be reduced.

UEs 102 may be configured to reuse a received CSI-RS signal set 108 to perform both CoMP measurement and CoMP resource management. By reusing CSI-RS signal set 108 for CoMP resource management, system 100 may not require additional CSI-RS signals to be sent and thus may reduce resource use from the perspective of TPs 104. Furthermore, each of UEs 102 may require use of fewer ports, thus reducing the necessary processing resources and power for conducting CoMP resource management. In addition, each of UEs 102 may monitor a reduced number of subframes of CSI-RS signal set 108.

UEs 102 may be configured to reuse a received CSI-RS signal set 108 to perform both CoMP measurement and CoMP resource management in any suitable manner. In one embodiment, a given UE 102 may be configured to determine an RSRP of an associated TP 104 from a CSI-RS signal set 108, wherein the TP 104 is included within the CoMP resource management set 112 of the given UE 102. Such a calculated RSRP may be used to perform resource management decisions for the TP 104.

A given UE 102 may be configured to calculate RSRP for a TP 104 within an associated CoMP resource management set 112 in any suitable manner. For example, by knowing the signal waveform transmitted by the associated TP 104, UE 102 may decode the received signal and calculate the RSRP as the power of the signal times the channel power gain.

In one embodiment, a UE 102 may only need to monitor for a CSI-RS signal set 108 of a subset of outbound CSI ports of a given TP 104. For example, a TP 104 may have four such ports and a UE 102 may only need to monitor for CSI-RS signal set 108 of two such ports. In such an embodiment, UE 102 may be configured to compensate for a number of actual ports used to transmit CSI-RS signal set 108 by an associated TP 104 while determining RSRP for CSI-RS signal set 108. The compensation may be necessary because such a RSRP calculation may underestimate the actual RSRP from TP 104. UE 102 may be configured to make such compensation by determining, for a $TP_i$:

$$RSRP_i = \frac{M}{N} RSRP_i^S(W)$$

wherein M is the total number of CSI-RS ports transmitted by the $TP_i$; N is the number of CSI-RS ports monitored by UE 102; and $RSRP_i^S(W)$ is the measurement of RSRP by UE 102 measurement of CSI-RS signal set 108 received from the TP, through its N CSI-RS ports. The corrected RSRP may be used by UE 102 and TP 104 to determine CoMP resource management set 112 and CoMP measurement set 110 of UE 102.

In another embodiment, UE 102 may be configured to monitor CSI-RS signal sets 108 for a subset of the subframes sent between UE 102 and TP 104. A full set of the subframes sent between UE 102 and TP 104 may be necessary for CoMP measurement. However, a monitored subset of such subframes may be sufficient for CoMP resource management in terms of accuracy. The definition of such a subset of subframes may include configuring UE 102 to monitor CSI-RS signal sets 108 in only 1 out every K subframes transmitted by an associated TP 104. For example, K can be 4, 8, or 16. In such an embodiment, additional correction necessary may be unnecessary in relation to the monitoring of a subset of the subframes. Furthermore, in such an embodiment, UE 102 may monitor a subset of the subframes for a given TP 104 appearing within the associated CoMP resource management set 112 but not within the associated CoMP measurement set 110.

Figure 2:
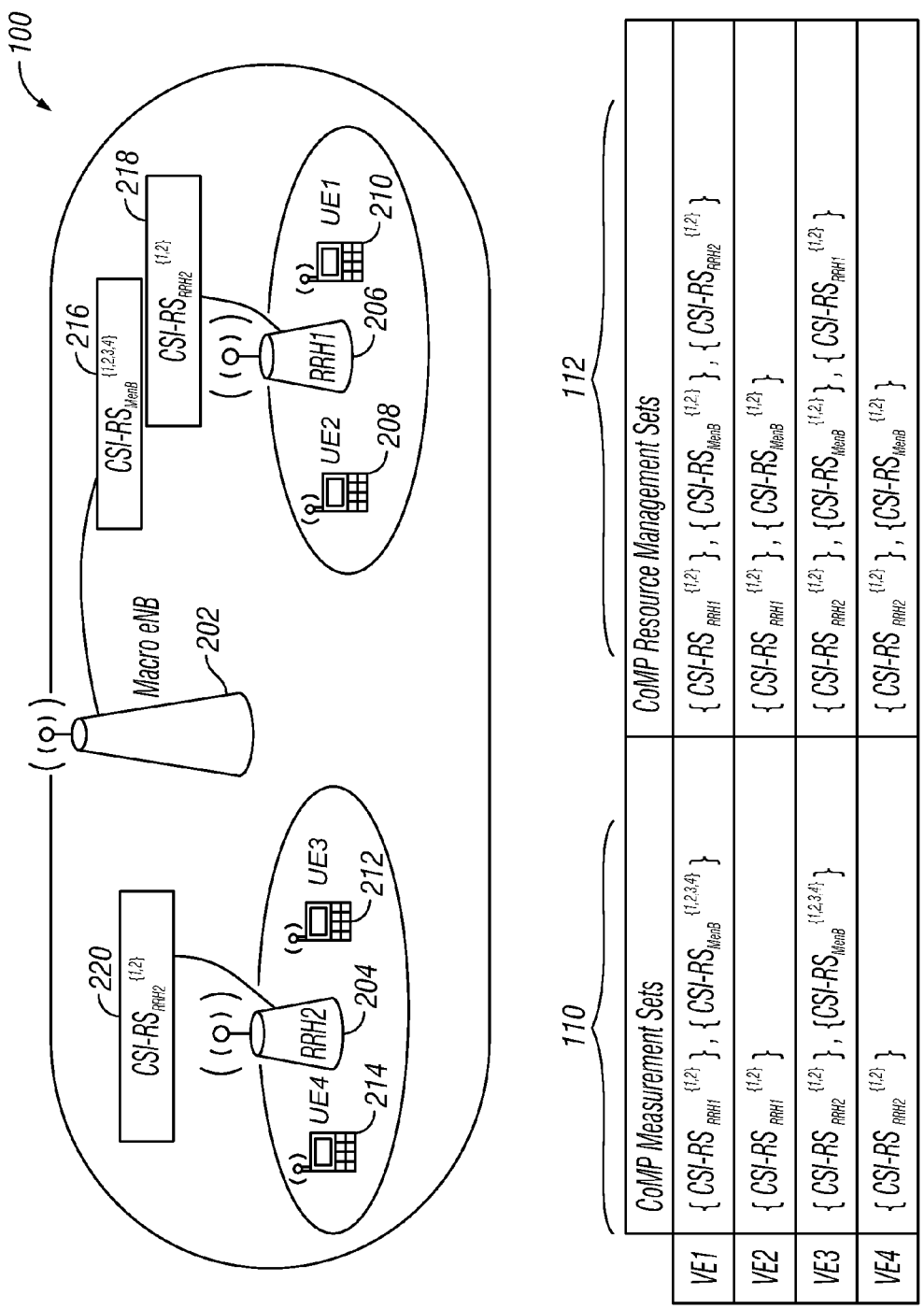
FIG. 2 is a more detailed illustration of an example embodiment of a system, illustrating operation.

FIG. 2 is a more detailed illustration of an example embodiment of system 100, illustrating operation of the example embodiment. System 100 may include a macro eNB (MeNB) 202 communicatively coupled to a first remote radio head (RRH1) 202 and a second remote radio head (RRH2) 204. MeNB 202, RRH1 206, and RRH1 204 may each implement a TP 104 of FIG. 1. MeNB 202 may be communicatively coupled to network 106.

System 100 may include a first UE (UE1) 208, a second UE (UE2) 210, a third UE (UE3) 212, and a fourth UE (UE4) 214. One or more of UE1 208, UE2 210, UE3 212, and UE4 214 may be communicatively coupled to one or more of RRH1

206 and RRH1 204. By being communicatively coupled to one or more of RRH1 206 and RRH1 204, UE1 208, UE2 210, UE3 212, and UE4 214 may be also communicatively coupled to MeNB 202. Furthermore, one or more of UE1 208, UE2 210, UE3 212, and UE4 214 may be directly communicatively coupled to MeNB 202. The specific configuration of communication between UEs 208, 210, 212, 214 and TPs (RRHs 204, 206 and MeNB 202) may be dependent upon the presence of UEs within the coverage areas of each of the TPs. If a given UE is within a coverage area of a TP, an active downlink communication may be established between the UE and the TP. The active downlink communication may correlate to the given TP present within the CoMP measurement set of the given UE. As a given UE moves towards the edge of a coverage area, maintaining an active downlink communication link may be more difficult and the chances of handoff to another TP may increase. TPs which are not within the CoMP measurement set of a given UE, but which are candidates for such a CoMP measurement set, may be included within the CoMP resource management set of the given UE. Thus, UE CoMP measurement sets may include a given TP wherein the UE appears at the edge of such a TP's coverage area.

In the specific example of FIG. 2, RRH1 206 and RRH1 204 may be deployed within the coverage area of MeNB 202. Furthermore, UE1 208 may be located within the coverage area of RRH1 206. UE2 210 may also be located within the coverage area of RRH1 206, but further out in the coverage area of MeNB 202 and further away from RRH1 204. In addition, UE3 212 may be located within the coverage area of RRH1 204. UE4 214 may also be located within the coverage area of RRH1 204, but further out in the coverage area of MeNB 202 and further away from RRH1 206.

As such, UE1 208 may include MeNB 202 and RRH1 206 within its CoMP measurement set. UE1 208 may include these elements and RRH1 204 within its CoMP resource management set. UE2 210 may include RRH1 206 within its CoMP measurement set, and RRH1 206 and MeNB 202 within its CoMP resource management set. UE3 212 may include RRH1 204 and MeNB 202 within its CoMP measurement set, and RRH1 204, MeNB 202, and RRH1 within its CoMP resource management set. UE4 214 may include RRH1 204 within its CoMP measurement set, and RRH1 204 and MeNB 202 within its CoMP resource management set. These example relationships are illustrated in the table below:

|  | CoMP measurement set | CoMP resource management set |
| --- | --- | --- |
| UE1 | {MeNB, RRH1} | {MeNB, RRH1, RRH2} |
| UE2 | {RRH1} | {MeNB, RRH1} |
| UE3 | {MeNB, RRH2} | {MeNB, RRH1, RRH2} |
| UE4 | {RRH2} | {MeNB, RRH2} |

Furthermore, each such monitored set of signals from MeNB may be monitored according to the available CSI signal set 108 from the respective TP. For example, MeNB 202 may issue CSI-RS signal set 216, indicating that CSI-RS signals are broadcast on ports one, two, three, and four. RRH1 206 may issue CSI-RS signal set 218, indicating that CSI-RS signals are broadcast on ports one and two. RRH2 204 may issue CSI-RS signal set 220, indicating that CSI-RS signals are broadcast on ports one and two. Each of UEs 208, 210, 212, 214 that monitor received CSI-RS signals from MeNB 202 for resource management may monitor only signals from ports one and two.

Accordingly, CSI-RS measurement sets 110 and CSI-RS resource management sets 112 may indicate the sets of CSI signals that are monitored for CoMP measurement and CoMP resource management, respectively, for a given UE.

Thus, MeNB 202 may transmit CSI-RS signal set 216 to UE1 208. UE1 208 may monitor CSI-RS signal set 216 to compute or estimate CSI signal strength or other characteristics and feed back such determinations to MeNB 202. UE1 208 may monitor ports one, two, three, and four for such a determination. MeNB 202 may make routing or configuration decisions based on such measurements sent by UE1 208.

In addition, UE1 208 may determine, calculate, or measure one or more measurements for resource management associated with MeNB 202, such as RSRP, from the monitored components of CSI-RS signal set 216. Ports one and two may be monitored to make such a determination. UE1 208 may make such a determination and feed back such information to MeNB 202. Such a determination may be used to determine whether to maintain or activate a downlink for MeNB 202.

RRH1 206 may transmit CSI-RS signal set 218 to UE1 208. UE1 208 may monitor CSI-RS signal set 218 to compute or estimate CSI signal strength, CQI, PMI, RI, or other characteristics and feed back such determinations to RRH1 206 or MeNB 202. UE1 208 may monitor ports one and two for such a determination. MeNB 202 or RRH1 206 may make routing or configuration decisions based on such measurements sent by UE1 208.

In addition, UE1 208 may determine, calculate, or measure one or more measurements for resource management associated with RRH1 206, such as RSRP, from the monitored components of CSI-RS signal set 218. UE1 208 may make such a determination and feed back such information to MeNB 202 or RRH1 206. Such a determination may be used to determine whether to maintain or activate a downlink for RRH1 206.

RRH1 206 may transmit CSI-RS signal set 218 to UE2 210. UE2 210 may monitor CSI-RS signal set 218 to compute or estimate CSI signal strength, CQI, PMI, RI, or other characteristics and feed back such determinations to RRH1 206 or MeNB 202. UE2 210 may monitor ports one and two for such a determination. MeNB 202 or RRH1 206 may make routing or configuration decisions based on such measurements sent by UE2 210.

In addition, UE2 210 may determine, calculate, or measure one or more measurements for resource management associated with RRH1 206, such as RSRP, from the monitored components of CSI-RS signal set 218. UE2 210 may make such a determination and feed back such information to MeNB 202 or RRH1 206. Such a determination may be used to determine whether to maintain or activate a downlink for RRH1 206.

MeNB 202 may transmit CSI-RS signal set 216 to UE3 212. UE3 212 may monitor CSI-RS signal set 216 to compute or estimate CSI signal strength or other characteristics and feed back such determinations to MeNB 202. UE3 212 may monitor ports one, two, three, and four for such a determination. MeNB 202 may make routing or configuration decisions based on such measurements sent by UE3 212.

In addition, UE3 212 may determine, calculate, or measure one or more measurements for resource management associated with MeNB 202, such as RSRP, from the monitored components of CSI-RS signal set 216. Ports one and two may be monitored to make such a determination. UE3 212 may make such a determination and feed back such information to MeNB 202. Such a determination may be used to determine whether to maintain or activate a downlink for MeNB 202.

RRH2 204 may transmit CSI-RS signal set 220 to UE3 212. UE3 212 may monitor CSI-RS signal set 220 to compute or estimate CSI signal strength, CQI, PMI, RI, or other characteristics and feed back such determinations to RRH2 204 or MeNB 202. UE3 212 may monitor ports one and two for such a determination. MeNB 202 or RRH2 204 may make routing or configuration decisions based on such measurements sent by UE3 212.

In addition, UE3 212 may determine, calculate, or measure one or more measurements for resource management associated with RRH2 204, such as RSRP, from the monitored components of CSI-RS signal set 220. UE3 212 may make such a determination and feed back such information to MeNB 202 or RRH2 204. Such a determination may be used to determine whether to maintain or activate a downlink for RRH2 204.

RRH2 204 may transmit CSI-RS signal set 220 to UE4 214. UE4 214 may monitor CSI-RS signal set 220 to compute or estimate CSI signal strength, CQI, PMI, RI, or other characteristics and feed back such determinations to RRH2 204 or MeNB 202. UE4 214 may monitor ports one and two for such a determination. MeNB 202 or RRH2 204 may make routing or configuration decisions based on such measurements sent by UE4 214.

In addition, UE4 214 may determine, calculate, or measure one or more measurements for resource management associated with RRH2 204, such as RSRP, from the monitored components of CSI-RS signal set 220. UE4 214 may make such a determination and feed back such information to MeNB 202 or RRH2 204. Such a determination may be used to determine whether to maintain or activate a downlink for RRH2 204.

Furthermore, as CoMP resource management sets 112 include elements not within corresponding CoMP measurement sets 110, each of UE1 208, UE2 210, UE3 212, and UE4 214 may perform additional measurements for resource management.

For example, RRH2 204 may transmit CSI-RS signal set 220 to UE1 208, even though UE1 208 does not include RRH2 204 within its CSI-RS measurement set 110. UE1 208 may monitor CSI-RS signal set 220 to determine, calculate, or measure one or more measurements for resource management associated with RRH2 204, such as RSRP. UE1 208 may feed back such determinations to RRH2 204 or MeNB 202. UE1 108 may monitor ports one and two for such a determination. Based on such a determination, RRH2 204, MeNB 202, or UE1 108 may determine whether to activate a downlink for RRH2 204 for UE1 108.

MeNB 202 may transmit CSI-RS signal set 216 to UE2 210, even though UE2 210 does not include MeNB 202 within its CSI-RS measurement 110. UE2 210 may monitor CSI-RS signal set 216 to determine, calculate, or measure one or more measurements for resource management associated with MeNB 202, such as RSRP. UE2 210 may feed back such determinations to MeNB 202. UE2 210 may monitor ports one and two for such a determination. Based on such a determination, MeNB 202 or UE2 210 may determine whether to activate a downlink for MeNB 202 for UE2 210.

RRH1 206 may transmit CSI-RS signal set 216 to UE3 212, even though UE3 212 does not include RRH1 206 within its CSI-RS measurement set 110. UE3 212 may monitor CSI-RS signal set 216 to determine, calculate, or measure one or more measurements for resource management associated with RRH1 206, such as RSRP. UE3 212 may feed back such determinations to RRH1 206 or MeNB 202. UE3 212 may monitor ports one and two for such a determination. Based on such a determination, RRH1 206, MeNB 202, or UE3 212 may determine whether to activate a downlink for RRH1 206 for UE3 212.

MeNB 202 may transmit CSI-RS signal set 216 to UE4 214, even though UE4 214 does not include MeNB 202 within its CSI-RS measurement 110. UE4 214 may monitor CSI-RS signal set 216 to determine, calculate, or measure one or more measurements for resource management associated with MeNB 202, such as RSRP. UE4 214 may feed back such determinations to MeNB 202. UE4 214 may monitor ports one and two for such a determination. Based on such a determination, MeNB 202 or UE4 214 may determine whether to activate a downlink for MeNB 202 for UE4 214.

The set of CSI-RS monitored by UEs 208, 210, 212, 214 in FIG. 2 for CSI measurement and feedback may be given as:

| | CSI-RS monitored for CoMP measurement and feedback |
|---|---|
| UE1 | $\{\text{CSI-RS}_{RRH1}{}^{\{1,2\}}\}\{\text{CSI-RS}_{MeNB}{}^{\{1,2,3,4\}}\}$ |
| UE2 | $\{\text{CSI-RS}_{RRH1}{}^{\{1,2\}}\}$ |
| UE3 | $\{\text{CSI-RS}_{RRH2}{}^{\{1,2\}}\}\{\text{CSI-RS}_{MeNB}{}^{\{1,2,3,4\}}\}$ |
| UE4 | $\{\text{CSI-RS}_{RRH2}{}^{\{1,2\}}\}$ |

Thus, the set of CSI-RS monitored by UEs 208, 210, 212, 214 in FIG. 2 for CoMP resource management may be given as:

| | CSI-RS monitored for CoMP resource management |
|---|---|
| UE1 | $\{\text{CSI-RS}_{RRH1}{}^{\{1,2\}}\}\{\text{CSI-RS}_{MeNB}{}^{\{1,2\}}\}\{\text{CSI-RS}_{RRH2}{}^{\{1,2\}}\}$ |
| UE2 | $\{\text{CSI-RS}_{RRH1}{}^{\{1,2\}}\}\{\text{CSI-RS}_{MeNB}{}^{\{1,2\}}\}$ |
| UE3 | $\{\text{CSI-RS}_{RRH1}{}^{\{1,2\}}\}\{\text{CSI-RS}_{MeNB}{}^{\{1,2\}}\}\{\text{CSI-RS}_{RRH2}{}^{\{1,2\}}\}$ |
| UE4 | $\{\text{CSI-RS}_{RRH1}{}^{\{1,2\}}\}\{\text{CSI-RS}_{MeNB}{}^{\{1,2\}}\}$ |

In addition, the set of CSI-RS monitored by UEs 208, 210, 212, 214 in FIG. 2 only for CoMP resource management, and not for CoMP measurement (at least until additional downlinks are activated) may be given as:

| | CSI-RS monitored only for CoMP resource management |
|---|---|
| UE1 | $\{\text{CSI-RS}_{RRH2}{}^{\{1,2\}}\}$ |
| UE2 | $\{\text{CSI-RS}_{MeNB}{}^{\{1,2\}}\}$ |
| UE3 | $\{\text{CSI-RS}_{RRH1}{}^{\{1,2\}}\}$ |
| UE4 | $\{\text{CSI-RS}_{MeNB}{}^{\{1,2\}}\}$ |

Wherein UE1 208 and UE3 212 may monitor only ports one and two of CSI-RS signal set 216 from MeNB 202, and such CSI-RS signal set 216 includes transmissions over ports one, two, three, and four, each of UE1 208 and UE3 212 may make any suitable adjustment to their RSRP calculations. For example, given an RSRP calculation from monitoring ports one and two, and applying the formula given above of $\{RSRP_i = (M/N) \, RSRP_i^S(W)\}$, UE1 208 and UE3 212 may multiply an initially calculated RSRP by two. The resulting, corrected RSRP may be used by UE1 208, UE3 212, or MeNB 202 to process the associated CSI-RS resource management set 112.

Furthermore, for UE1 208 monitoring CSI-RS signal set 220 from RRH2 204, UE2 210 monitoring CSI-RS signal set 216 from MeNB 202, UE3 212 monitoring CSI-RS signal set 218 from RRH1 206, or UE4 214 monitoring CSI-RS signal set 216 from MeNB 202, the respective UEs 208, 210, 212, 214 may only monitor the CSI-RS signals transmitted in some of the subframes. For example, each of UEs 208, 210, 212, 214 may monitor only one out of every four, eight, or sixteen subframes from the signal sets identified above.

As a result, system 100 may include equipment configured to reuse information transmitted for CoMP measurements through CSI-RS ports of a TP 104 for CoMP resource management, wherein a UE 102 includes the given TP 104 in its CoMP resource management set 112. A dedicated CSI-RS resource may not be required for such CoMP resource management. MeNB 202 configures the CSI-RS signals to be used and monitored by a given UE 102 for CoMP resource management. The individual sets of CSI-RS signals monitored by a given UE 102 for CoMP resource management may be a superset of the sets of CSI-RS signals monitored by the given UE 102 for CoMP measurement. Such CSI-RS signals for CoMP resource management may be a subset of all the CSI-RS signals transmitted by a TP 102, signal from a subset of available CSI-RS ports, or a subset of the transmitted subframes. If only a subset of the available CSI-RS ports from a given TP 103 is used for CoMP resource management, correction of the measurement may be necessary to compute the true RSRP.

Figure 3:
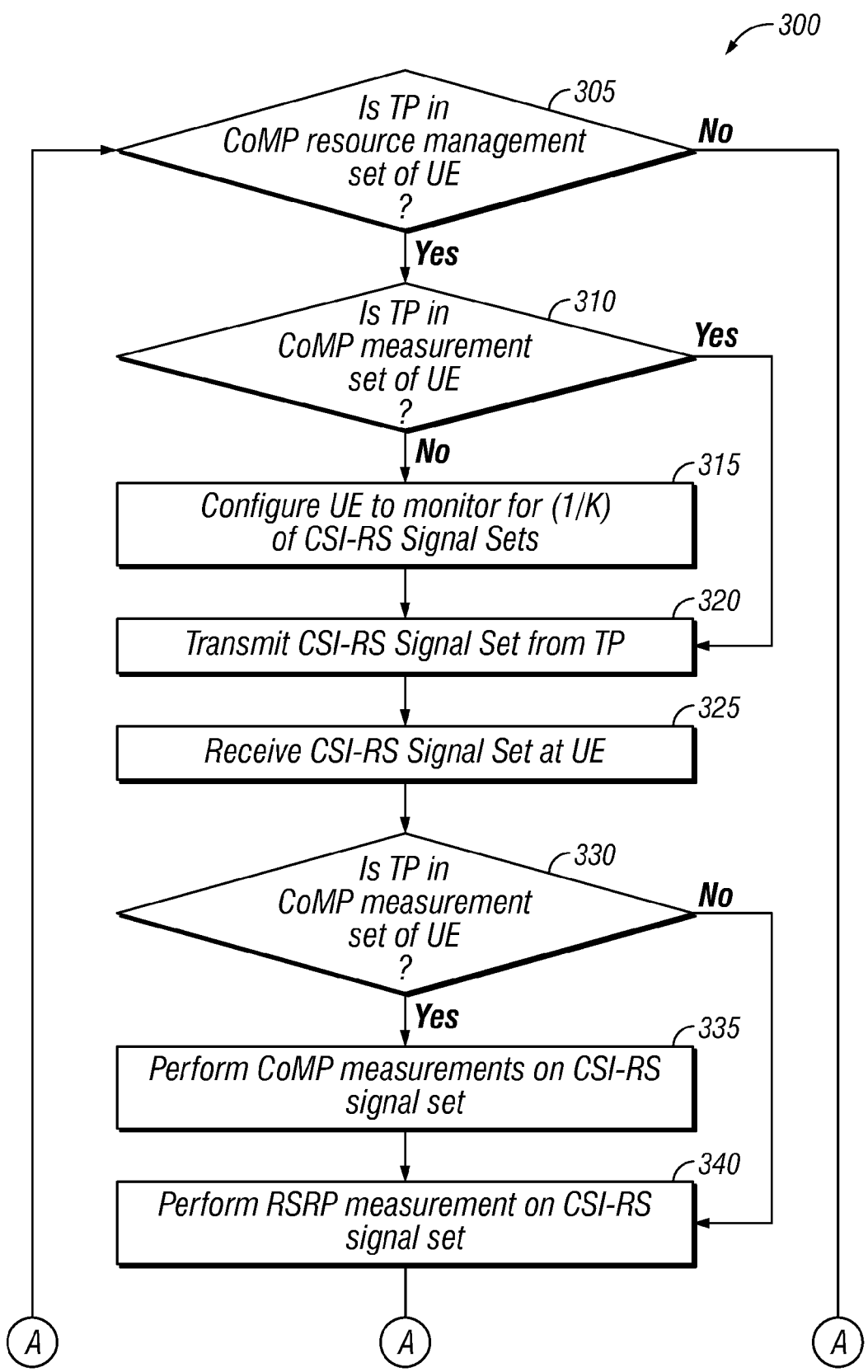
FIG. 3 illustrates an example embodiment of a method for coordinated multipoint resource management.
Figure 3:
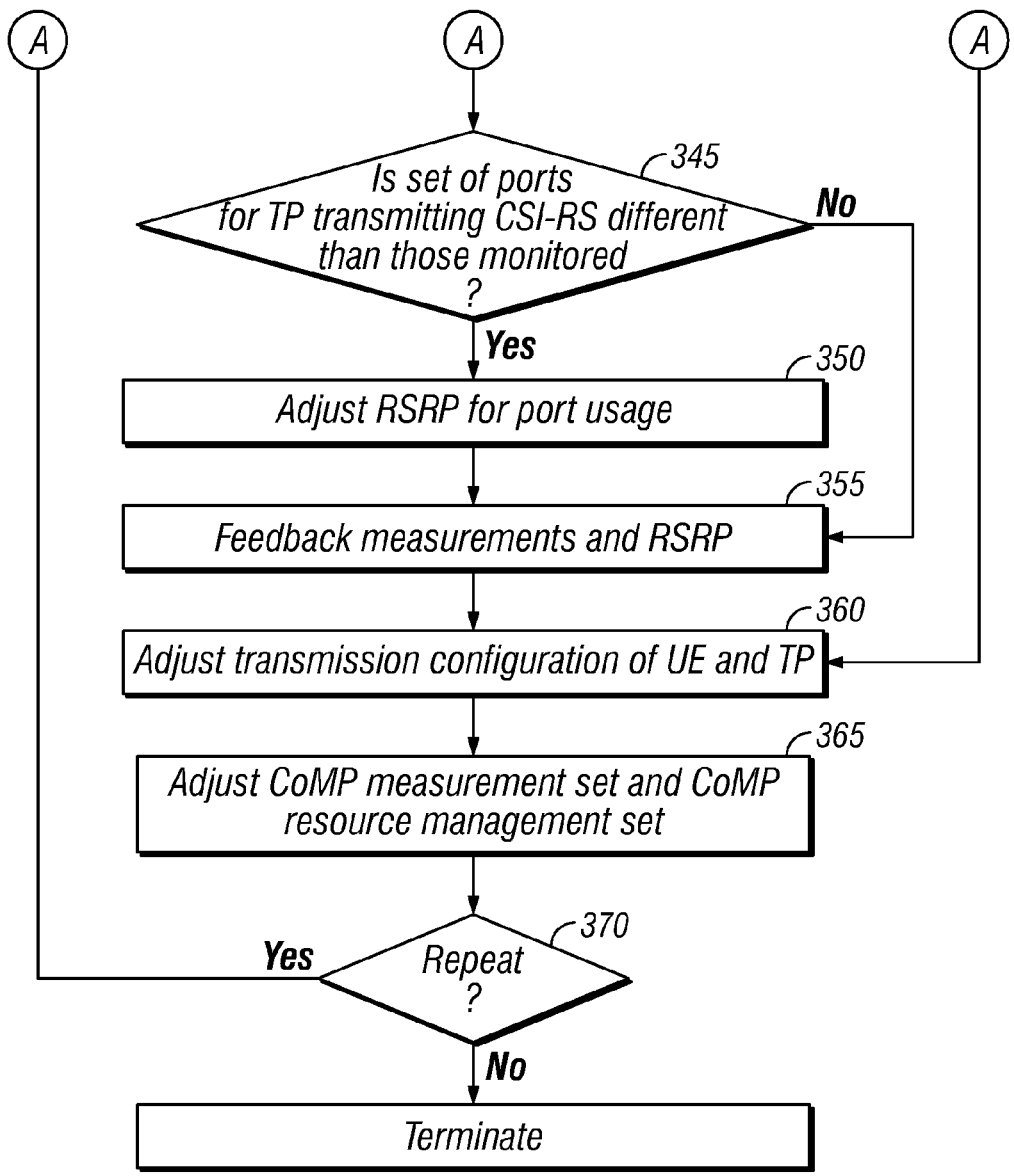

FIG. 3 illustrates an example embodiment of a method 300 for coordinated multipoint resource management. Method 300 may perform any number or kind of steps in accordance with the configuration of system 100 as described above.

Method 300 may be performed to determine resource management information or other data between a given TP and a given UE in a wireless system. Method 300 may be repeated, or multiple instances of method 300 performed, for multiple such UEs and TPs.

At 305, it may be determined whether a given TP, such as a RRH or eNB, is within a given UE's CoMP resource management set. Inclusion within the CoMP resource management set may indicate that signals, such as CSI-RS signals, from the TP may be monitored to determine whether an active downlink between the UE and the TP should be maintained or activated.

At 310, it may be determined whether the given TP is within the UE's CoMP measurement set. Inclusion within the CoMP measurement set may indicate that the UE is configured to make certain measurements, such as CQI, PMI, and RI based on, for example, CSI-RS signals, and report the measurement to the TP. Furthermore, inclusion within the CoMP measurement set may indicate that there is an active downlink between the UE and the TP. If the given TP is within the UE's CoMP measurement set, method 300 may proceed to 320. If the given TP is not within the UE's CoMP measurement set, method 300 may proceed to 315.

At 315, the UE may be configured to monitor only a subset of the signals sent by the TP for resource management or measurement. For example, one out of every four, eight, or sixteen frames of the CSI-RS signals sent by the TP may be monitored by the UE.

At 320, a measurement signal set such as CSI-RS signals may be sent by the TP. At 325, the UE may monitor the signals sent at 320. At 330, it may be determined whether the TP is within the UE's measurement set. 300 may be implemented in similar fashion to 310. In one embodiment, method 300 may use the previous determination in 310 rather than explicitly repeat the operation in 300. If the TP is within the UE's measurement set, method 300 may proceed to 335. If the TP is not within the UE's measurement set, method 300 may proceed to 340.

At 335, CoMP measurements may be performed on the received CSI-RS signals. Such measurements may include, for example, CQI, PMI, and RI. At 340, CoMP resource management may be performed on the received CSI-RS signals, such as RSRP calculations. At 345, it may be determined whether the number of ports monitored is different than the number of ports used by the TP for transmitting the CSI-RS signals. For example, two ports may be monitored while the TP may have transmitted the signals across four ports. If the number of ports monitored is different than the number of ports used in transmission, then method 300 may proceed to 350. Otherwise, method 300 may proceed to 355.

At 350, the RSRP may be adjusted for port usage. The RSRP measurement may be multiplied by a quotient of the total number of ports used to transmit the CSI-RS signals over the number of ports that are monitored.

At 355, measurements such as channel measurements and RSRP may be fed back to the TP. Such measurements may be fed to other TPs, such as an eNB communicatively coupled to the TP.

At 360, the configuration of TPs and UEs in the wireless system may be evaluated. Such an evaluation may be based on the measurements of the UE or upon similarly made measurements by other UEs. If necessary, the transmission configuration of the TP or the UE may be adjusted. At 365, the contents of the CoMP measurement set or CoMP resource management set of the UE may be adjusted. For example, a downlink between the TP and the UE may be activated, maintained, or deactivated. The downlink may be maintained or activated in the measurements of RSRP were above a defined threshold, or deactivated if the measurements of RSRP were below the defined threshold. Activating a downlink between the UE and the TP may cause the TP to be added to the CoMP measurement set of the UE. Deactivating a downlink between the UE and the TP may cause the TP be removed from the CoMP measurement set of the UE. Additional TPs may be added or removed from the CoMP resource management set of the UE, based upon the geographical location of the UE.

At 370, it may be determined whether method 300 is to be repeated. If so, method 300 may return to 305. If not, method 300 may terminate.

Although FIG. 3 discloses a particular number of steps to be taken with respect to example method 300, method 300 may be executed with more or fewer steps than those depicted in FIG. 3. In addition, although FIG. 3 discloses a certain order of steps to be taken with respect to method 300, the steps comprising this method may be completed in any suitable order. Method 300 may be implemented using the systems, embodiments, and examples of FIGS. 1-2 as shown above. In certain embodiments, method 300 may be implemented partially or fully in software embodied in computer-readable storage media.

Although the present invention has been described with several embodiments, various changes and modifications may be suggested to one skilled in the art. It is intended that the present invention encompass such changes and modifications as fall within the scope of the appended claims.

What is claimed is:

1. A method for resource management, comprising:
  determining a Coordinated Multi-point Processing (CoMP) resource management set of a user equipment (UE), the CoMP resource management set including a plurality of candidate transmission points (TP) for which downlink communication may be established with the UE;
  receiving a set of channel state information reference signals (CSI-RS) at the UE from a TP whose information is included within the CoMP resource management set;
  determining a resource management parameter based upon the CSI-RS signals;

sending the determined resource management parameter to the TP;
determining a first number of CSI ports used to transmit the CSI-RS signals;
determining a second number of CSI ports used to monitor the CSI-RS signals, wherein the first number and second number are different; and
adjusting the determined resource management parameter based upon the first number and the second number.

2. The method of claim 1, further comprising:
determining a CoMP measurement set of the UE, the CoMP measurement set including a plurality of TPs for which active downlink communication is established and including the TP whose information is included within the CoMP resource management set; and
determining one or more of a Channel Quality Indicator (CQI), Precoding Matrix Indicator (PMI), and Rank Indicator (RI) based upon the CSI-RS signals.

3. The method of claim 1, further comprising:
determining a CoMP measurement set of the UE, the CoMP measurement set including a plurality of TPs for which active downlink communication is established and including the TP whose information is included within the CoMP resource management set; and
determining one or more channel measurements of the CoMP measurement set, based upon the CSI-RS signals, the channel measurements including at least one of a Channel Quality Indicator (CQI), Precoding Matrix Indicator (PMI), or Rank Indicator (RI);
wherein the determined resource management parameter and the channel measurements are based upon the same CSI-RS signals.

4. The method of claim 1, further comprising:
determining a CoMP measurement set of the UE, the CoMP measurement set including a plurality of TPs for which active downlink communication is established and excluding the TP whose information is included within the CoMP resource management set; and
based on the determination of the CoMP measurement set, sampling a subset of the frames of the CSI-RS signals.

5. The method of claim 1, wherein the determined resource management parameter includes a reference signal received power.

6. The method of claim 1, wherein the determined resource management parameter includes a received power of the CSI-RS signal.

7. An article of manufacture comprising:
a non-transitory computer readable medium; and
computer-executable instructions carried on the non-transitory computer readable medium, the instructions readable by a processor, the instructions, when read and executed, for causing the processor to:
determine a Coordinated Multi-point Processing (CoMP) resource management set of a user equipment (UE), the CoMP resource management set including a plurality of candidate transmission points (TP) for which downlink communication may be established with the UE;
receive a set of channel strength information reference signals (CSI-RS) at the UE from a TP whose information is included within the CoMP resource management set;
determine a resource management parameter based upon the CSI-RS signals;
send the determined resource management parameter to the TP;
determine a first number of CSI ports used to transmit the CSI-RS signals;
determine a second number of CSI ports used to monitor the CSI-RS signals, wherein the first number and second number are different; and
adjusting the determined resource management parameter based upon the first number and the second number.

8. The article of claim 7, wherein the processor is further caused to:
determine a CoMP measurement set of the UE, the CoMP measurement set including a plurality of TPs for which active downlink communication is established and including the TP whose information is included within the CoMP resource management set; and
determine one or more of a Channel Quality Indicator (CQI), Precoding Matrix Indicator (PMI), and Rank Indicator (RI) based upon the CSI-RS signals.

9. The article of claim 7, wherein the processor is further caused to:
determine a CoMP measurement set of the UE, the CoMP measurement set including a plurality of TPs for which active downlink communication is established and including the TP whose information is included within the CoMP resource management set; and
determine one or more channel measurements of the CoMP measurement set based upon the CSI-RS signals, the channel measurements including at least one of a Channel Quality Indicator (CQI), Precoding Matrix Indicator (PMI), or Rank Indicator (RI);
wherein the determined resource management parameter and the channel measurements are based upon the same CSI-RS signals.

10. The article of claim 7, wherein the processor is further caused to:
determine a CoMP measurement set of the UE, the CoMP measurement set including a plurality of TPs for which active downlink communication is established and excluding the TP whose information is included within the CoMP resource management set; and
based on the determination of the CoMP measurement set, sample a subset of the frames of the CSI-RS signals.

11. The article of claim 7, wherein the determined resource management parameter includes a reference signal received power.

12. The article of claim 7, wherein the determined resource management parameter includes a received power of the CSI-RS signal.

13. A method for resource management, comprising:
sending one or more sets of channel state information reference signals (CSI-RS) from a host transmission point (TP) to one or more user equipment (UE), wherein the TP's information is included within a Coordinated Multi-point Processing (CoMP) resource management set of each UE;
receiving at the host TP one or more determined resource management parameters based upon the CSI-RS signals from each UE, wherein:
the one or more determined resource management parameters include an adjustment based upon a first number of CSI ports used to transmit the CSI-RS signal and a second number of CSI ports used to monitor the CSI-RS signals; and
the first number and second number are different; and
based upon the determined resource management parameters, determining whether to include a second TP in the CoMP resource management set.

14. The method of claim 13, wherein the host TP and the second TP are the same.

15. The method of claim 13, wherein the host TP and the second TP are different.

16. The method of claim 13, wherein determining whether to include the second TP in the CoMP resource management set includes determining whether CSI-RS signals will be sent from the second TP to the UE.

17. An article of manufacture comprising:
a non-transitory computer readable medium; and
computer-executable instructions carried on the non-transitory computer readable medium, the instructions readable by a processor, the instructions, when read and executed, for causing the processor to:
send one or more sets of channel state information reference signals (CSI-RS) from a host transmission point (TP) to one or more user equipment (UE), the TP's information is included within a Coordinated Multi-point Processing (CoMP) resource management set of each UE;
receive at the host TP one or more determined resource management parameters based upon the CSI-RS signals from each UE, wherein:
the one or more determined resource management parameters include an adjustment based upon a first number of CSI ports used to transmit the CSI-RS signal and a second number of CSI ports used to monitor the CSI-RS signals; and
the first number and second number are different; and
based upon the determined resource management parameters, determine whether to include a second TP in the CoMP resource management set.

18. The article of claim 17, wherein the host TP and the second TP are the same.

19. The article of claim 17, wherein the host TP and the second TP are different.

20. The article of claim 17, wherein determining whether to include the second TP in the CoMP resource management set includes determining whether CSI-RS signals will be sent from the second TP to the UE.

* * * * *